United States Patent
Garnier et al.

(10) Patent No.: US 10,408,696 B2
(45) Date of Patent: Sep. 10, 2019

(54) METHOD AND DEVICE FOR MEASURING PATH FOLLOWING UNDER LOAD

(71) Applicants: UNIVERSITE DE NANTES, Nantes (FR); CENTRE NATIONAL DE LA RECHERCHE SCIENTIFIQUE, Paris (FR)

(72) Inventors: Sébastien Garnier, La Chapelle sur Erdre (FR); Benoît Furet, Nantes (FR)

(73) Assignees: UNIVERSITE DE NANTES, Nantes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 148 days.

(21) Appl. No.: 15/532,494

(22) PCT Filed: Dec. 7, 2015

(86) PCT No.: PCT/EP2015/078893
§ 371 (c)(1),
(2) Date: Oct. 7, 2017

(87) PCT Pub. No.: WO2016/087681
PCT Pub. Date: Jun. 9, 2016

(65) Prior Publication Data
US 2018/0038748 A1 Feb. 8, 2018

(30) Foreign Application Priority Data
Dec. 5, 2014 (FR) .................................. 14 61954

(51) Int. Cl.
*G01B 21/04* (2006.01)
*G01B 3/30* (2006.01)
(Continued)

(52) U.S. Cl.
CPC .............. *G01L 5/0038* (2013.01); *G01B 3/30* (2013.01); *G01B 21/042* (2013.01);
(Continued)

(58) Field of Classification Search
CPC ..... G01B 21/042; G01B 3/30; G01M 99/007; G01L 5/0038; G05B 2219/37101;
(Continued)

(56) References Cited

U.S. PATENT DOCUMENTS 4,435,905 A * 3/1984 Bryan ..................... G01B 7/02
33/613
5,259,120 A 11/1993 Chapman et al.
(Continued)

FOREIGN PATENT DOCUMENTS

| EP | 0 258 471 A1 | 3/1988 |
| EP | 0 526 056 A1 | 2/1993 |
| EP | 0 786 644 A2 | 7/1997 |

*Primary Examiner* — Jacques M Saint Surin
(74) *Attorney, Agent, or Firm* — IM IP Law; C. Andrew Im; Chai Im

(57) ABSTRACT

A device for measuring a path under load of a first part that is in motion relative to a second part. The device includes an active telescopic bar and a connector. The telescopic bar includes a scale to measure the length of the bar, a coupler to ball link at each end of the bar, and a force sensor to measure the force applied to the bar along its longitudinal axis. The connector links each end of the bar to the first and second part, respectively. The spatial components of the force applied to one of the connector are measured. A measuring method utilizing the device.

14 Claims, 3 Drawing Sheets

(51) Int. Cl.
*G01M 99/00* (2011.01)
*G01L 5/00* (2006.01)

(52) U.S. Cl.
CPC . *G01M 99/007* (2013.01); *G05B 2219/37101* (2013.01); *G05B 2219/37343* (2013.01); *G05B 2219/37619* (2013.01); *G05B 2219/39034* (2013.01)

(58) Field of Classification Search
CPC ........... G05B 2219/37619; G05B 2219/39034; G05B 2219/37343
USPC .......................................................... 73/584
See application file for complete search history.

(56) References Cited

U.S. PATENT DOCUMENTS

| | | | | |
|---|---|---|---|---|
| 5,428,446 A * | 6/1995 | Ziegert | ................ | G01B 11/002 250/231.11 |
| 5,647,136 A * | 7/1997 | Jostlein | ................ | G01B 21/042 33/502 |
| 5,681,981 A * | 10/1997 | McMurtry | ........... | B23Q 1/5462 33/502 |
| 5,813,128 A | 9/1998 | Bailey | | |
| 5,900,938 A * | 5/1999 | Huang | ................ | G01B 9/02029 356/138 |
| 6,205,839 B1 * | 3/2001 | Brogårdh | ................ | B25J 9/1692 318/568.16 |
| 6,269,544 B1 * | 8/2001 | Pahk | ...................... | G01B 21/04 33/502 |
| 6,519,860 B1 * | 2/2003 | Bieg | ........................ | B23H 7/26 33/1 PT |
| 6,836,323 B2 * | 12/2004 | Schmadel | ........... | G01B 21/042 33/502 |
| 7,296,955 B2 * | 11/2007 | Dreier | .................... | B25J 9/1692 33/502 |
| 7,612,516 B2 * | 11/2009 | Wang | .................... | G05B 19/401 318/568.19 |
| 7,997,001 B1 * | 8/2011 | Mekid | .................. | G01B 21/042 33/783 |
| 2005/0016008 A1 | 1/2005 | Raab et al. | | |
| 2007/0162404 A1 | 7/2007 | Gorelik et al. | | |

* cited by examiner

METHOD AND DEVICE FOR MEASURING PATH FOLLOWING UNDER LOAD

RELATED APPLICATIONS

This application is a § 371 application from PCT/EP2015/078893 filed Dec. 7, 2015, which claims priority from French Patent Application No. 14 61954 filed Dec. 5, 2014, each of which is herein incorporated by reference in its entirety.

FIELD OF THE INVENTION

The invention relates to a method and device for measuring path following under load. The invention is more particularly but not exclusively intended for the area of robotics and machine tools.

BACKGROUND OF THE INVENTION

Documents U.S. Pat. No. 5,259,120/EP0526056 or U.S. Pat. No. 5,813,128/EP0786644 disclose a device, generally known as a "ball-bar" device, and a method for analyzing the precision with which a machine tool follows a path. That first device of the prior art consists in a telescopic bar connected by balls at its ends between a fixed point on one side and a mobile point on the other side, carried physically by a part of a machine tool, generally the spindle of said machine, which is adapted to move in relation to said fixed point. The method consists in moving the mobile point along a circular path centered on the fixed point and measuring, during that path, the length variations of the telescopic bar. Those length variations correspond to path following faults, and make it possible to characterize the dynamic precision of the machine tool being tested. In the case of a machine tool, the machine is highly rigid in view of the forces to which said machine is subjected during use, so that such dynamic characterization is representative of the precision of the machine. In the case of a robot, the kinematic chain is much less rigid than that of a machine tool, so that such characterization is not representative of the capacities of said robot, and the precision and ability of said robot to follow a path are affected by the loads applied to it. In the prior art, a robot is thus characterized statically vis-a-vis the stiffness of its kinematic chain by applying, through a loading device, a force screw to its part adapted to receive an effector, generally the wrist, while the movements are blocked and by measuring the deviation of the position of said wrist under the effect of said screw. These measurements characterize the stiffness of the kinematic chain and bring out the play, play under load and positioning hysteresis, which data are introduced in control correction tables that make it possible to compensate for such faults in operation, at least in part, essentially to obtain precise positioning. This method of the prior art is sufficient for carrying out manipulation operations known as "pick and place" or generally fixed positioning operations such as drilling a hole or welding a tack. However, robots are increasingly used for operations that make it necessary to follow a path, such as trimming, deburring, orbital drilling, bead welding, friction stir welding or additive fabrication, without this list being exhaustive; said path must be followed at speed that is fully controlled. The characterization methods of the prior art do not make it possible to understand and then correct the combined effects of accelerations and forces on the quality of the following of said path.

Document U.S. Pat. No. 6,662,261 describes a device for calibrating the movements of a robot or a machine tool along 6 degrees of freedom, using 6 telescopic measuring bars that extend between 2 assemblies of 3 spheres each contained in a plane, where one is fixed and the other is related the mobile part of the machine or robot. In a particular embodiment of the device, the 6 measuring bars are active and make it possible to apply a force screw on the plane defined by the 3 spheres linked to the mobile part. However, the device is complex, in terms of its design, its implementation and also the interpretation of the results derived from it.

OBJECT AND SUMMARY OF THE INVENTION

This invention aims to remedy the drawbacks of the prior art and therefore relates to a device for measuring a path under load of a first part that is in motion in relation to a second part, comprising:
  a. an active telescopic bar comprising:
    ai. means to measure the length of said bar;
    aii. coupling means for a link comprising two degrees of rotational freedom at each end of said bar;
    aiii. means for measuring the force applied to the bar along its longitudinal axis;
  b. connecting means to link each end of the bar to the first and second part respectively comprising means to measure the spatial components of the force applied using said linking means.

Thus, the knowledge of the spatial components of the force applied by the bar along its longitudinal axis and the direction of the bar, whether by direct measurement or from the force components, makes it possible to study the response under load of the kinematic chains involved in the path completed. Throughout the document, the terms "active telescopic bar" refer to a telescopic bar or actuator adapted to deliver force along its longitudinal axis, regardless of the technology used to produce that force.

The invention can be implemented advantageously in the embodiments described below which may be considered individually or in any technically operative combination.

In one embodiment of the device according to the invention, the coupling means comprise a ball link at least at one end of the bar. The ball link allows greater freedom of movement and thus makes it possible to use the device according to the invention to characterize the robot along very diverse paths. It also offers the benefit of not transmitting the force torques, which is advantageous in some conditions of measurement and characterization.

In another embodiment of the device according to the invention, which is compatible with the previous one, the coupling means comprise a universal joint link at one end of the bar at least. The universal joint link particularly makes it easier to apply tensile forces. Besides, it allows the direct measurement of the rotation angles of the two pivots of the universal joint.

Advantageously, the device according to the invention comprises means for measuring the spatial components of the force applied to each linking means. Thus, the knowledge of the spatial components of the force on each linking means makes it possible to know the direction of a part in relation to the other, particularly while carrying out complex paths.

Advantageously, the device according to the invention comprises means for adjusting the intensity of the force applied by the telescopic bar. Thus, the device makes it possible to calibrate a single path under several force intensities.

In one embodiment, the active bar comprises spring means for applying a force proportional to the length of said bar. This embodiment is particularly simple to make and implement, and particularly allows the adjustment of the intensity of the load by the path.

In another embodiment, the active bar comprises means for applying a constant force regardless of the length of the bar. This embodiment allows more flexible use.

The invention also relates to a method for measuring a path under load of a part that is moving relative to another, using the device according to the invention in any of its embodiments, which method comprises the steps of:
  i. connecting the ends of the telescopic bar to the first and second part;
  ii. programming a relative path of the first part in relation to the second part, comprising a path entry movement and a path exit movement, so that the distance between the two parts along the longitudinal axis of the bar is constant during said path;
  iii. applying a force with a defined intensity along the longitudinal axis of the telescopic bar to the connecting means;
  iv. carrying out the path defined in step (ii), by measuring the following during said path:
    length variations of the telescopic bar;
    variations in the force applied to the longitudinal axis of the bar;
    variations of the components of the force applied to one of the coupling means.

Thus, the method according to the invention makes it possible to measure path following deviations when the parts are subjected to a force with determined direction and intensity.

In a particular embodiment of the method according to the invention, using a telescopic bar in which force is applied by spring means, the intensity of the force applied in step (iii) is determined by the path entry movement. This embodiment is particularly easy to implement and makes it possible to rapidly cover an operating range of the assembly to calibrate.

In that same particular embodiment, the longitudinal force measurement of step (iv) is achieved by measuring the length of the telescopic bar.

In one implementation of the method according to the invention, the first part is fixed and the path is carried out by the second part. This embodiment is similar to the calibration tests carried out by the ball bar devices of the prior art, but adds the influence of loading to the tests, which are thus directly comparable with tests without loading obtained using methods of the prior art.

In this embodiment, the path programmed in step (ii) and carried out in step (iv) is advantageously an arc of a circle.

In an advantageous alternative embodiment, the longitudinal axis of the telescopic bar is not parallel to the plane of the arc travelled in step (iv). The means for measuring the spatial components of the force make it possible to measure, at any time, the direction of the force and therefore of the bar during the path; thus, the device and method according to the invention make it possible to bring out three-dimensional path following faults, which are difficult to bring out with the means of the prior art.

In one embodiment of the method according to the invention using a device comprising a universal joint link at one of its ends, the method comprises a step of taking a measurement of the azimuth or the elevation of the bar.

The invention also relates to a method for determining the vibration response of a part in a defined configuration of direction, using a device according to the invention comprising a universal joint link at the two ends of the bar and comprising the steps of:
  applying periodic stress on the two ends of the bar;
  measuring the response to the periodic stress by the bar length variation.

BRIEF DESCRIPTION OF THE DRAWINGS

The invention is described below in its preferred embodiments, which are not limitative in any way, and by reference to FIGS. 1 to 6, wherein.

DETAILED DESCRIPTION OF THE EMBODIMENTS

Figure 1:
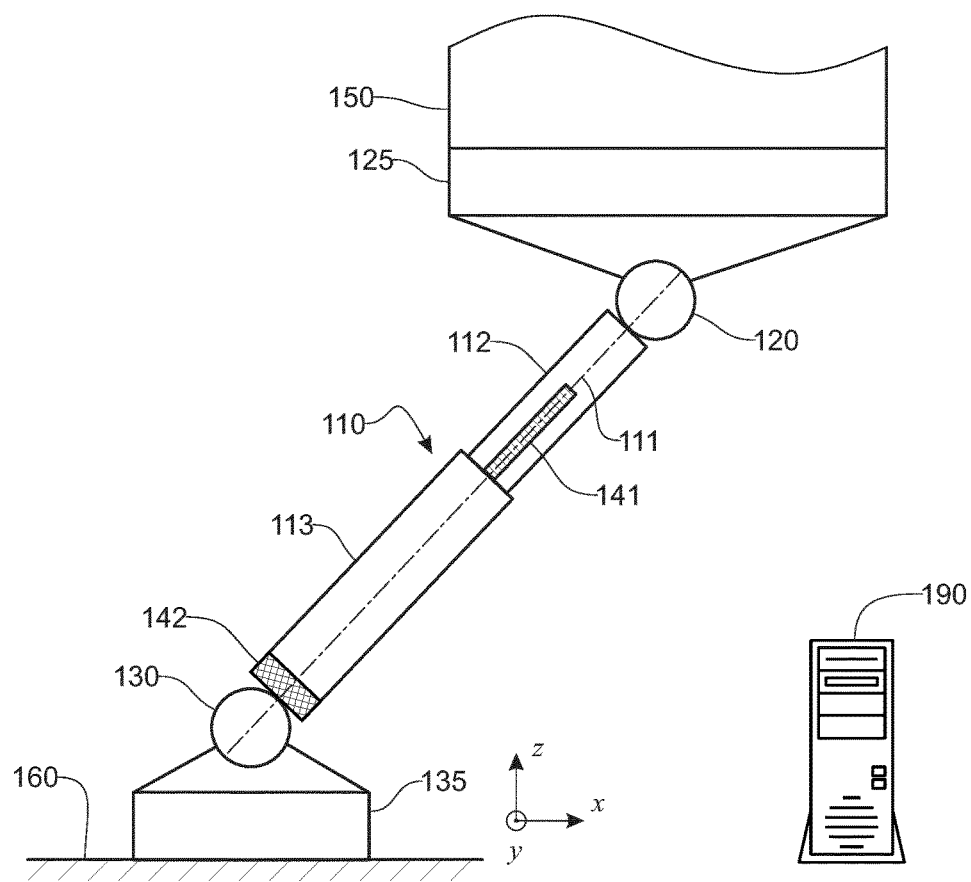
FIG. 1 is a schematic front view of an exemplary embodiment of the device according to the invention.

In FIG. 1 of an exemplary embodiment of the device according to the invention, the device is used to measure the path of a moving part of a machine tool (150) or a robot, in relation to a fixed reference (160). Said device comprises an active telescopic bar (110), comprising a slide (112) that slides in a sleeve (113), adapted to produce a force between its two ends. Said ends comprise coupling means (120, 130) for making the link with the linking means (125, 135), one of which (125) is fixed to the moving part (150) and the other (135) to the fixed reference (160), in this exemplary implementation. In this embodiment, said links are ball links so that they do not transmit torques. The telescopic bar (110) is active and comprises means for generating a force along its longitudinal axis (111). In non-limitative and non-exhaustive examples, said means for generating a force consist in means acting between the sleeve (113) and the slide (112) and comprise: tensile or compressive spring means, such as elastic washers, pneumatic or hydraulic means, electrical means, for example in the form of a linear micromotor, a piezoelectric motor or an electromagnetic device. Said telescopic bar (110) also comprises means (140) to measure the relative displacement of the slide (112) in relation with the sleeve (130), for example in the form of an optical rule, which makes it possible to measure the variations in length of the bar (110). A force sensor (142), placed here at the sleeve (113), makes it possible to measure the force to which the bar is subjected along its longitudinal axis (111). Alternatively, when the means for generating the force consist in spring means, the longitudinal force is measured by the means (140) for measuring the displacement.

In this exemplary embodiment of the device according to the invention, the means for linking (135) with the fixed reference (160) comprises means (not shown) for measuring the components of the force applied to that means along the x, y and z axes, in a reference linked to said means (135). In another embodiment, the linking means (120) fixed to the moving part (150) also comprises means for measuring the components of the force applied to it in its own reference. Thus, the intensity of the force applied by the telescopic bar (110) is known by means of the sensor (142) of the bar and the components of the forces determined by these sensors make it possible to determine the direction of the telescopic bar relative to said linking means (125, 135).

The implementation of the device according to the invention consists in creating a defined path of the mobile part (150) in relation to the fixed reference (160) when the telescopic bar applies a force between the two linking means (125, 135) and acquiring, during that path, the length variations of the telescopic bar, the value of the force applied along the longitudinal axis (110) of the bar (110) and the force components applied to the linking means fitted with such a sensor. In an exemplary embodiment, those data are sent to a control unit (190) provided with an acquisition board, by radio or wired means.

Figure 2:
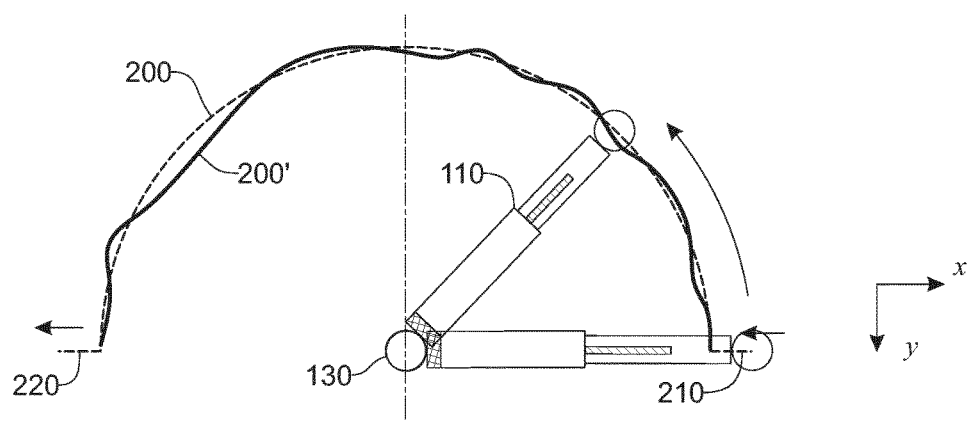
FIG. 2 is a top view of a schematic exemplary embodiment of the carrying out of a control or calibration path with the device in FIG. 1.

In FIG. 2 of an exemplary embodiment, the telescopic bar (110) is installed between the two linking means, and a path is made by the moving part. In this exemplary embodiment, said path comprises an entry portion (210), which corresponds here to a linear displacement parallel to the x axis. That displacement significantly shortens the telescopic bar (110) and is easily detected on the signals from the means for measuring the length of said bar. That makes it possible to detect the start of the test. In this exemplary embodiment, the measuring path (200) corresponds to an arc path centered on one of the ends of the telescopic bar, for example the ball link (130) connecting the bar to the linking means with the fixed reference. Thus, in theory, the length of the telescopic bar is constant during that path. Depending on the type of robot or machine analyzed and its articulation configuration, the path used for implementing the method is any path, preferably a path contained on a spherical surface, but the theoretical length of the telescopic bar is not necessarily constant while said path is being followed. In all cases, the path (200') actually followed shows deviations from the theoretical path (200). In practice, these deviations are secondary in degree in relation to the radius of the programmed theoretical path (200). Thus, depending on the nature of the moving part, robot or machine tool, the deviations between the theoretical path (200) and the actual path (200') are a 1000th to a 10,000th of the radius of said path, if it is a circular, or the theoretical variations of the length of the telescopic bar if said path is any other path. Thus, even if the force is applied by simple means such as a spring acting between the sleeve and the slide of the telescopic bar, the force variations resulting from these path deviations are negligible and can, if needed, be determined either from the force sensor of the telescopic bar or from the length variations of that bar if greater precision is required. A path exit portion (220) corresponds to a linear movement that significantly modifies the length of the telescopic bar. Thus, that movement makes it possible to detect the exit from the measurement path. The comparison of the force measured on the telescopic bar sensor and the components of that force on the measuring means of the linking means makes it possible at all times to know the direction of the telescopic bar in a reference linked to said linking means. That measurement principle also makes it possible to determine the direction of the measurement axes of the force components of the linking or coupling means in relation with the axes of the robot or the machine. Thus, a first calibration cycle consists in carrying out linear displacements similar to the displacements corresponding to the entry and exit positions (210, 220) in different directions of the telescopic bar. When the telescopic bar is turned in a direction that is not contained in the plane of the path (200), the device according to the invention makes it possible to detect three-dimensional faults, for example parasite movements of the mobile part along the z axis, when the programmed path lies entirely in the plane x, y. In a particular embodiment, corresponding for example to the case where the force imposed by the telescopic bar is produced by a spring, the length of the path corresponding to the entry portion (210) that sets the length of the telescopic bar and the compression of the spring also makes it possible to set the force applied by the telescopic bar on the linking means. Advantageously, in this embodiment, said telescopic bar comprises means (not shown) that make it possible to pre-stress said spring means to thus define the force applied.

Figure 3:
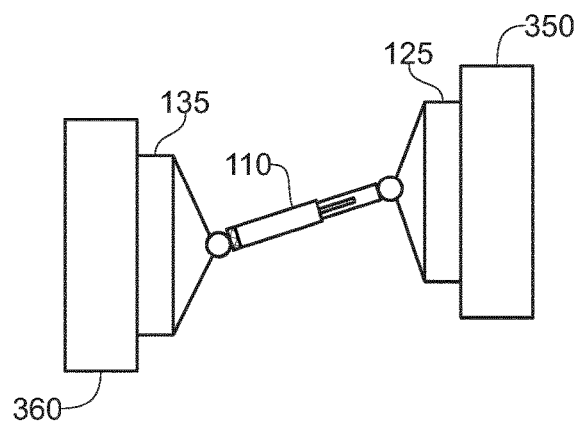
FIG. 3 is a front view of an exemplary use of the device according to the invention between two moving parts.

In FIG. 3 of another example of use of the device according to the invention, the device is installed between two moving parts (360, 350), adapted to move relative to each other, but in a coordinated movement. This type of situation may for example correspond to the case of a riveting system where one of the mobile parts carries the riveting die and the other the riveting die for riveting. Another example of application that could be made by implementing the device according to the invention for the purpose of calibration or control is described in document EP 1 689 558. In this case the two linking means (135, 125) comprise means to measure the components of the force. Thus, in addition to the ability to measure the behavior of the machine under load, the measurement of the components makes it possible to determine the relative positioning and direction faults of the two mobile parts along any path.

Figure 4:
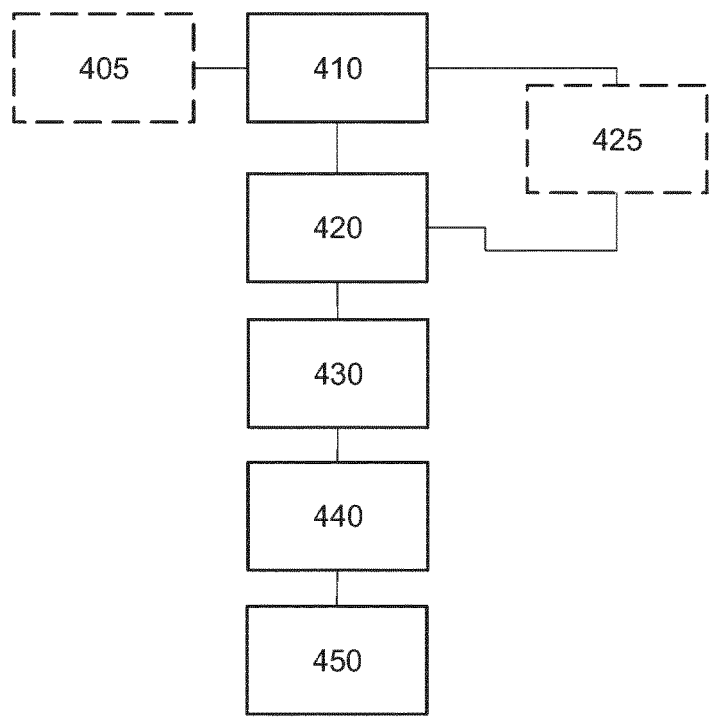
FIG. 4 is a logical diagram of an exemplary embodiment of the method according to the invention.

In FIG. 4 of an exemplary embodiment of the method according to the invention, the telescopic bar is installed between the linking means during an installation step (410). Optionally, particularly when the means for loading the bar are spring means, a calibration step (405) makes it possible to determine the actual stiffness of the bar by mounting said bar on a calibration bench. Advantageously, that calibration bench is made in material with a low thermal coefficient of expansion and makes it possible, at the same time, to precisely calibrate the actual length of the telescopic bar and the means for measuring its length variation during that same calibration step (405). During a programming step (420), placed randomly here but not necessarily, after the installation step, the path followed during the test is programmed in the reference of the mobile part or each mobile part, depending on the case of application. Optionally, that programming step (420) is preceded or followed by a positioning step (425) aimed at positioning one or both of the linking means in the reference of the mobile parts. To simplify the analysis of the results, the measurement path programmed during the programming step (420) is such that depending on the programmed theoretical path, the length of the bar is constant. During a loading step (430), the telescopic bar is loaded by applying compression or tension. The loading method depends on the means for generating the force. When these means are spring means, loading may for example be carried out during the path corresponding to the entry portion of the path. If the means are pneumatic, hydraulic or electric, they are programmable over a large length range of the telescopic bar. During a measuring step (440), the measurement path is followed at the same time as signals are acquired from the different sensors:

the telescopic bar length sensor;
the telescopic bar force sensor;
the signals corresponding to the components of the forces on the linking means.

In a particular embodiment, this measurement step comprises the acquisition of optional signals such as the control currents of the axis motors of the moving part or the signals from the displacement encoders of those same axes, in order to obtain a more precise diagnosis of the behavior of the mobile part. The data thus acquired are compiled in a processing step (450) to obtain an operating diagnosis. That cycle is then resumed with another path, another imposed force or another travelling speed of the measurement path.

Figure 5:
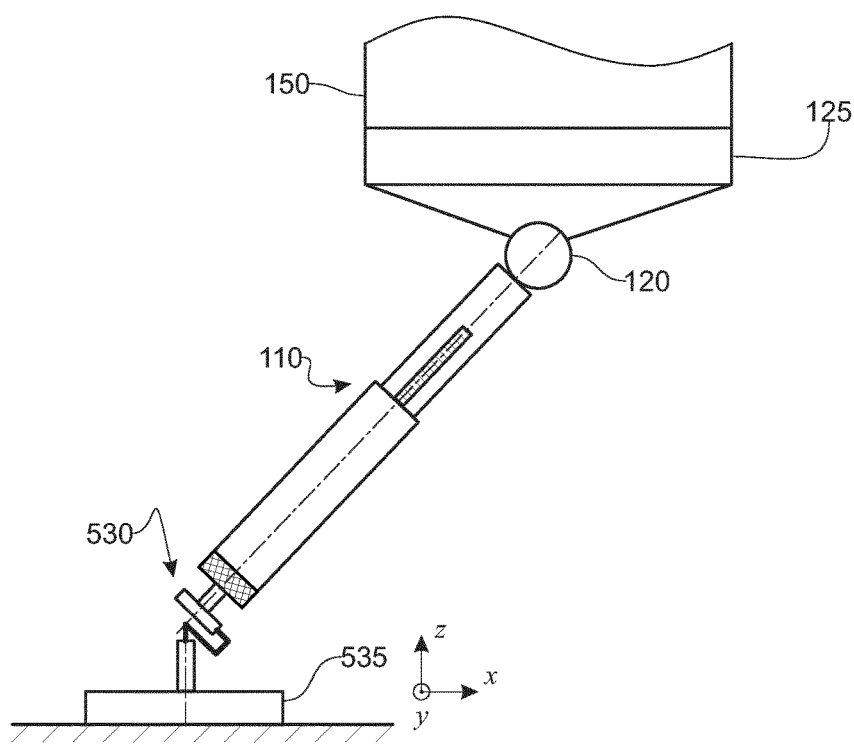
FIG. 5 is a schematic front view of an exemplary embodiment of the device according to the invention where one of the coupling links of the bar uses a universal joint.

In FIG. 5 of an alternative embodiment, one of the couplings (535) is a universal joint (530), for example the coupling with the fixed reference (160), and the link (120) of the coupling means (125) at the other end of the bar (110) is a ball link. This embodiment allows a direct measurement of the azimuth angle, that is to say in the plane in which the coupling means (535) is fixed, and the elevation angle, that is to say the angle formed by the bar (110) with the plane on which is fixed the coupling means (535) bearing the universal joint link, that is the fixed reference (160) in this implementation. These direct measurements are advantageously implemented during the measurement step of the method according to the invention.

Figure 6:
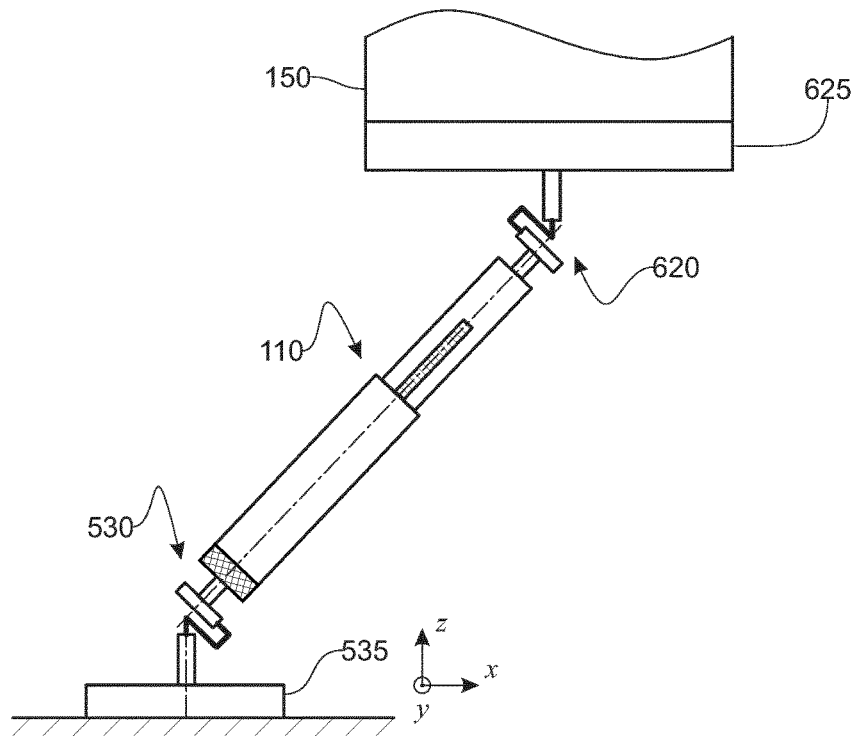
FIG. 6 is a schematic front view of an exemplary embodiment of the device according to the invention where the two coupling links of the bar use universal joints.

In FIG. 6 of another alternative embodiment, the two couplings (625, 535) at the ends of the bar (110) are made by universal joints (530, 620). This embodiment makes it possible, for example, to apply to these links, through the active telescopic bar (110), two-directional stresses that are tensile and compressive, particularly periodic low-amplitude stresses. Thus, this embodiment makes it possible to study the vibration modes of the robot, or more generally of the characterized system, with different azimuth angles and different elevations. The periodic stresses are applied either directly by means of the bar (110), for example when the bar comprises a pneumatic, hydraulic or electric actuator, or by the displacements of one of the ends of the bar. The bar length (110) variation measurement makes it possible to determine the vibratory response of the studied system to those stresses, and particularly to identify the frequencies of its first fundamental modes. This embodiment makes it possible, during three-dimensional path following, to easily measure the direction deviations along said path.

The description above and the exemplary embodiments show that the invention achieves the objectives sought, in particular by combining means to generate and measure an axial force with a device similar to the ball bar; the device according to the invention makes it possible to analyze the behavior of a machine or robot under a defined load, and also through the use of information about that force and changes during the measurement paths, to supplement the purely dimensional information with information about the direction of the telescopic bar in the machine reference.

The invention claimed is:

1. A measuring device to measure deviations under load of a programmed path followed by a first part of a machine tool or a robot that is in motion relative to a second part external to the machine tool or the robot, the measuring device comprising:
    a telescopic bar comprising: a scale to measure a length of the telescopic bar; a link, at each end of the telescopic bar, comprising two degrees of rotational freedom; an actuator configured to deliver a force along a longitudinal axis of the telescopic bar; and a force sensor to measure a force applied at each end of the telescopic bar along its longitudinal axis;
    connectors to link two ends of the telescopic bar to the first and second parts, respectively; and
    a controller configured to determine spatial components of a force applied to the connectors by the actuator of the telescopic bar during a motion of the first part.

2. The measuring device according to claim 1, wherein links comprise a ball link at least at one end of the telescopic bar.

3. The measuring device according to claim 1, wherein the links comprise a universal joint link at least at one end of the telescopic bar.

4. A method for determining a vibration response of a part in a defined configuration of direction, utilizing a measuring device according to claim 3 comprising a universal joint link at each end of the telescopic bar, the method comprising steps of applying, by the actuator, periodic stress on the two ends of the telescopic bar; and measuring a response to the periodic stress by a length variation of the telescopic bar.

5. The measuring device according to claim 1, wherein an intensity of a force applied by the actuator of the telescopic bar is adjustable.

6. The measuring device according to claim 1, wherein the actuator of the telescopic bar comprises a spring to apply a force proportional to the length of the telescopic bar.

7. The measuring device according to claim 1, wherein a constant force is applied by the actuator of the telescopic bar regardless of the length of the telescopic bar.

8. A method for measuring deviations under load of a programmed path followed by a first part that is moving relative to a second part, utilizing the measuring device according to claim 1, comprises steps of:
    connecting the two ends of the telescopic bar to the first and second parts, respectively;
    programming by a controller a relative path of the first part in relation to the second part comprising a path entry movement and a path exit movement, so that a distance between the two parts along the longitudinal axis of the telescopic bar is constant during the relative path;
    applying a force, by the actuator of the telescopic bar, with a defined intensity along the longitudinal axis of the telescopic bar to the connectors;
    executing the relative path while measuring length variations of the telescopic bar, variations in the force applied to the longitudinal axis of the telescopic bar, and variations of components of the force applied to one of the links.

9. The method according to claim 8, wherein the actuator comprises a spring to apply a force proportional to the length of the telescopic bar; and wherein the defined intensity of the force applied is determined by the path entry movement.

10. The method according to claim 9, further comprising a step of measuring a longitudinal force by measuring the length of the telescopic bar.

11. The method according to claim 8, wherein the first part is fixed; and wherein the relative path is performed by the second part.

12. The method according to claim 9, wherein the relative path programmed and executed is an arc of a circle.

13. The method according to claim 12, wherein the longitudinal axis of the telescopic bar is not parallel to the plane of the arc of the circle.

14. The method according to claim 8, wherein the links comprise a universal joint link at least at one end of the telescopic bar; and further comprising, during the step of executing the relative path, a step of taking a measurement of an azimuth or an elevation of the telescopic bar.

* * * * *